(12) United States Patent
Murashige et al.

(10) Patent No.: US 6,811,920 B2
(45) Date of Patent: Nov. 2, 2004

(54) CYLINDRICAL LITHIUM ION SECONDARY BATTERY AND FABRICATION METHOD THEREOF

(75) Inventors: Shinji Murashige, Hirakata (JP); Naoto Arai, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/414,017

(22) Filed: Apr. 16, 2003

(65) Prior Publication Data

US 2003/0198863 A1 Oct. 23, 2003

(30) Foreign Application Priority Data

Apr. 19, 2002 (JP) ........................................ 2002-117259

(51) Int. Cl.[7] .......................... H01M 2/04; H01M 10/36
(52) U.S. Cl. ........................ 429/94; 429/164; 429/174; 429/175
(58) Field of Search ........................... 429/94, 175, 164, 429/174, 53

(56) References Cited

U.S. PATENT DOCUMENTS 5,741,607 A * 4/1998 Gilmour ...................... 429/94
6,146,785 A * 11/2000 Rigobert et al. .............. 429/94
2002/0110729 A1 * 8/2002 Hozumi et al. ........... 429/94 X

FOREIGN PATENT DOCUMENTS

| JP | 4-332481 | 11/1992 |
| JP | 2001-216949 | 8/2001 |

* cited by examiner

*Primary Examiner*—John S. Maples
(74) *Attorney, Agent, or Firm*—McDermott Will & Emery LLP

(57) ABSTRACT

A lithium ion secondary battery is so designed as to facilitate the insertion of the top insulator plate and to secure the fixation of the electrode group. This structure can reduce the probability of the electrode group moving around in the battery case to be damaged when the battery is dropped or shocked, thereby maintaining high safety standards even when a high pressure is applied from outside the battery. In a lithium ion secondary battery provided with a safety valve and composed of an electrode group which consists of a band-shaped positive electrode plate and a band-shaped negative electrode plate wound together with a separator disposed therebetween and which is housed in a cylindrical metal battery case with a bottom, together with a top insulator plate, the top insulator plate is designed to be elastic and is provided in its center with a through hole into which a center core member is press-fitted.

12 Claims, 4 Drawing Sheets

F I G. 1
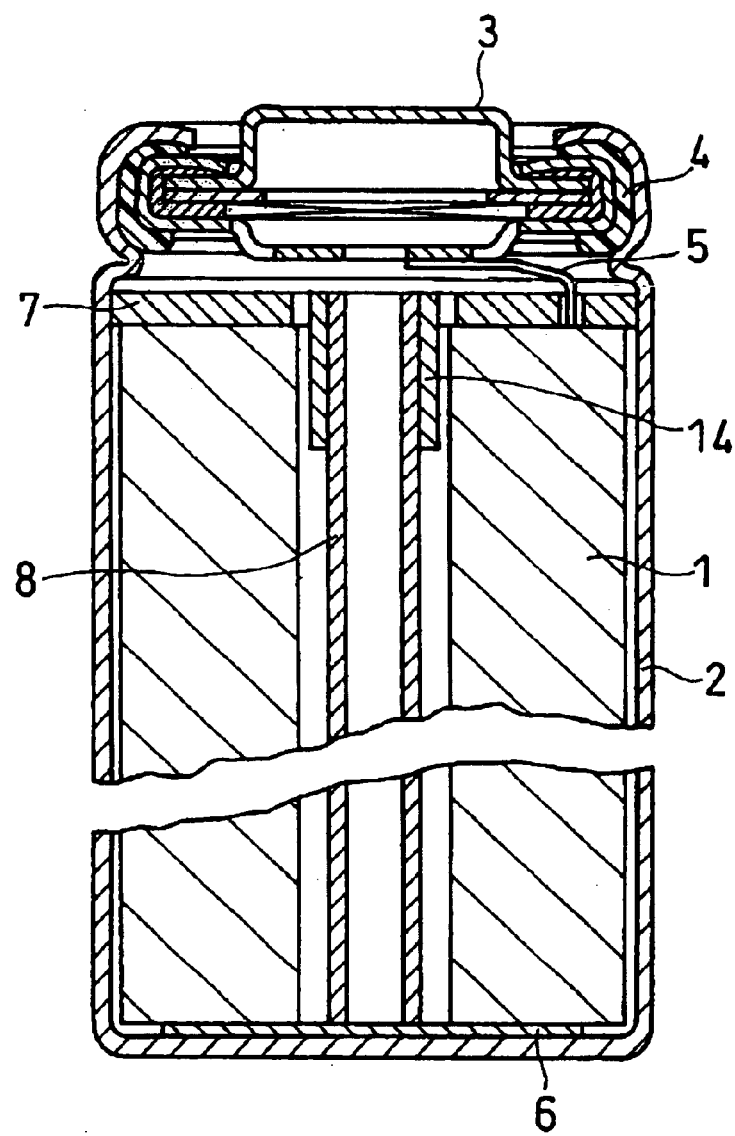

CYLINDRICAL LITHIUM ION SECONDARY BATTERY AND FABRICATION METHOD THEREOF

BACKGROUND OF THE INVENTION

The present invention relates to a lithium ion secondary battery, and more specifically, to a cylindrical lithium ion secondary battery equipped with a winding type electrode.

In recent years, portable and cordless electronic appliances including AV devices and personal computers are being developed in a rapid pace, and lithium ion secondary batteries are being used as a power supply for driving these appliances because the batteries have characteristics of being small, lightweight and having a high-energy density.

Among the lithium ion secondary batteries, a cylindrical lithium ion secondary battery is disclosed in Japanese Patent Publication No. 3143951 where a metallic center pin in the form of a hollow cylinder is arranged at the center space of the winding type electrode in order to maintain high safety standards even when a high pressure is applied to the battery from outside.

The batteries with this structure can be used as consumer-oriented batteries such as personal computers and cellular phones, but it is not appropriate to use them in electric vehicles and electric tools that cause somewhat large vibrations. This is because the electrode group, which is not fixed, is highly likely to be damaged while moving around inside the battery case. For example, the foil may be cut.

On the other hand, another lithium ion secondary battery is disclosed in Japanese Laid-Open Patent Publication No. 2001-216949, where a protruding element member having the same diameter as the inside diameter of the battery can, is placed in either both ends or one end of the electrode group and the protruding member is fixed in a core member made of polypropylene or the like. This structure prevents the winding type electrode from moving around in the battery case so as to achieve high assembling precision.

However, in order to fabricate a battery having such a structure, the protruding member is inserted while the projecting part of the protruding member is being inserted into a small hole in the center of the core member and the protruding outer region of the protruding member is being inserted in tight contact as a whole with the inner wall of the battery case. This deteriorates workability in the fabrication of the battery and makes it harder to assemble the battery.

In view of the aforementioned conventional problems, the present invention has an object of fixing the electrode group smoothly, thereby reducing the probability of the electrode group moving around in the battery to be damaged when the battery is dropped or shocked.

BRIEF SUMMARY OF THE INVENTIONS

The present invention relates to a cylindrical lithium ion secondary battery comprising:
 a safety valve;
 an electrode group comprising a band-shaped positive electrode plate and a band-shaped negative electrode plate which are wound together with a separator disposed therebetween; and
 a bottomed cylindrical metal battery case accommodating the electrode group together with a top insulator plate, the top insulator plate being designed to be elastic and provided in the center thereof with a through hole into which a center core member is press-fitted.

In this cylindrical lithium ion secondary battery, it is preferable that a plurality of protruding parts are provided on the outer peripheral surface of the top insulator plate, and that the tips of the protruding parts are in tight contact with the inner wall of the battery case.

In the top insulator plate, the diameter of a virtual circle formed by connecting the tips of the protruding parts before the press-fitting of the center core member is preferably 1 to 1.05 times the inner diameter of the metal battery case.

The top insulator plate preferably has a slit around the through hole.

The top insulator plate is preferably made of plastic.

The center core member is preferably made of metal.

It is preferable that the center core member is in the form of a hollow cylinder, and that at least one end of the center core member is a tapered or sharp end.

The center core member can have a slit extending in the longitudinal direction thereof.

The present invention also relates to a method for fabricating a cylindrical lithium ion secondary battery comprising the steps of:
 (a) preparing an electrode group by winding a band-shaped positive electrode plate and a band-shaped negative electrode plate together with a separator disposed therebetween, and accommodating the electrode group into a bottomed cylindrical metal battery case;
 (b) arranging a top insulator plate on the end surface of the electrode group, the top insulator plate being designed to be elastic and provided with a through hole at the center thereof; and
 (c) press-fitting a center core member into the through hole to fix the electrode group in the metal battery case.

In this fabrication method, it is preferable that a plurality of protruding parts are formed on the outer peripheral surface of the top insulator plate and that the diameter of a virtual circle formed by connecting the tips of the protruding parts before the press-fitting of the center core member is 1 to 1.05 times the inner diameter of the metal battery case.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a vertical cross-sectional view of the cylindrical lithium ion secondary battery of an example in accordance with the present invention.

DETAILED DESCRIPTION OF THE INVENTION

Figure 2:
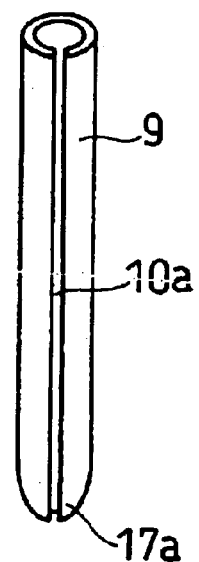
FIG. 2 is a perspective view of the hollow cylindrical center core member having a slit of an example in accordance with the present invention.

In order to achieve the object, the present invention is related to a cylindrical lithium ion secondary battery comprising: a safety valve; an electrode group comprising a band-shaped positive electrode plate and a band-shaped negative electrode plate which are wound together with a separator disposed therebetween; and a bottomed cylindrical metal battery case accommodating the electrode group together with a top insulator plate, characterized in that the top insulator plate is designed to be elastic and provided in the center thereof with a through hole into which a center core member is press-fitted. This structure enables the winding type electrode group be sandwiched between the inner bottom surface of the battery case and the surface of the top insulator plate, thereby fixing the electrode group to the battery case.

The method for fabricating a cylindrical lithium ion secondary battery in accordance with the present invention comprises the steps of; preparing an electrode group by winding a band-shaped positive electrode plate and a band-shaped negative electrode plate together with a separator disposed therebetween and accommodating the electrode group into a bottomed cylindrical metal battery case; arranging a top insulator plate on the end surface of the electrode group, the top insulator plate being designed to be elastic and provided with a through hole at the center thereof; and press-fitting the center core member into the through hole to fix the electrode group in the metal battery case. Since the top insulator plate is made of an elastic material and designed in a shape of exerting elasticity, it can be easily inserted into the battery case. And, the press-fitting of the center core member into the through hole can make the top insulator plate be propped and fixed between the inner wall of the battery case and the center core member and, as a result, the electrode group can be prevented from moving around in the battery case.

The present invention relates to a cylindrical lithium ion secondary battery comprising: a safety valve; an electrode group comprising a band-shaped positive electrode plate and a band-shaped negative electrode plate which are wound together with a separator disposed therebetween; and a bottomed cylindrical metal batter case accommodating the electrode group together with a top insulator plate, wherein the top insulator plate is designed to be elastic and provided in the center thereof with a through hole into which a center core member is press-fitted.

The cylindrical lithium ion secondary battery of the present invention is provided with a safety valve for discharging a gas when the gas pressure inside the battery increases under an extraordinary condition such as internal short-circuit in the battery. The top insulator plate can be made of an insulating material having some elasticity such as rubber, composite lamination, natural pulp, plastic or thermoplastic resin. Fragile materials such as ceramics are unsuitable.

The top insulator plate is designed to be elastic. In other words, the top insulator plate has a shape capable of exerting elasticity. The elasticity here indicates that the top insulator plate can be bent flexibly in the radial direction of the plate surface and, after the bending, a force works to return the bent shape of the top insulator plate to the original shape. This feature enables the top insulator plate to be securely fixed inside the battery case and the electrode group to be propped and fixed between the bottom surface of the battery case and the top insulator plate.

The top insulator plate can be designed in various shapes for this purpose, and it is also possible to provide a hole or cutting inside the regions where the top insulator plate is in tight contact with the battery case.

A center core member made of metal or the like is inserted into the through hole in the press-fitted condition. The top insulator plate is fixed by the propping force of the press-fitted center core member, and the electrode group wound is sandwiched between the inner bottom surface of the battery case and the downside of the top insulator plate, thereby effectively fixing the electrode group to the battery case.

In the cylindrical lithium ion secondary battery in accordance with the present invention, it is preferable that a plurality of protruding parts are provided on the outer peripheral surface or edge of the top insulator plate, and that the tips or ends of the protruding parts are in tight contact with the inner wall of the battery case.

It is preferable that the area of the tip of the protruding part in contact with the inner wall of the battery case or the size of the protruding part is made possibly smaller because the protruding part may cause resistance at the time of the insertion. It is necessary to provide three protruding parts in the top insulator plate, and it is preferable to provide four or more protruding parts in such a manner that these protruding parts are in contact with the inner wall of the battery case while virtually forming a regular polygon. When the number of the protruding parts is large, the processing cost increases and also the resistance at the time of the insertion increases. Therefore, four to eight protruding parts are especially preferable.

The tips of the protruding parts are preferably round, thin or sharp because it can decrease the contact area with the inner wall of the battery case while the top insulator plate is being inserted, and increases the contact pressure by the propping force after the center core member is press-fitted.

In the cylindrical lithium ion secondary battery in accordance with the present invention, it is preferable that the top insulator plate has a slit in the periphery of the through hole. The slit may be continuously communicated with the through hole. This design has the effect of securing the fixing of the top insulator plate because the press-fitting of the center core member bends the slit, thereby increasing the propping force in the top insulator plate.

The top insulator plate is preferably made of plastic. The reason for this is that the top insulator plate made of plastic can be appropriately elastic and can be easily designed into a shape capable of exerting elasticity. Among plastics, polypropylene (PP), polyethylene (PE), polyacetal (POM) are preferable because of their appropriate elasticity and processability.

The center core member is preferably made of metal. The rigidity of metals can increase the resistance when the battery is subjected to an external pressure during a crush test or the like. Among metals, stainless steel (SUS), nickel (Ni), titanium (Ti) and the like are most preferable because of their excellent processability, rigidity, and corrosion resistance against electrolyte.

It is preferable that the center core member is in the form of a hollow cylinder with or without a slit, and at least one end of the center core member has a tapered or sharp end. The hollow cylindrical shape with a slit indicates a shape obtained by forming a slit in a hollow cylinder in the longitudinal direction thereof. The center core member 9 in the form of a hollow cylinder can be provided with a straight-line slit 10$a$ as shown in FIG. 2, or a zigzag slit 10$b$ as shown in FIG. 3.

When an external pressure in such a crush test is applied to the center of the battery to damage the center regions and a gas is generated by short-circuit or the like, there is no means to discharge the gas on the side without a safety valve. The above-described structure, however, enables the gas to discharge from the safety value through the hollow regions and the slit.

Figure 3:
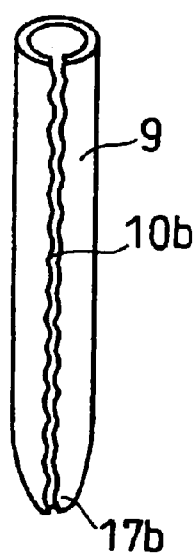
FIG. 3 is a perspective view of the hollow cylindrical center core member having a slit of another example in accordance with the present invention.

It is also preferable that the center core member has a tapered tip 17a or 17b as shown in FIGS. 2 and 3 in order to facilitate the insertion thereof into the through hole.

The method for fabricating a cylindrical lithium ion secondary battery in accordance with the present invention comprises the steps of: (a) preparing an electrode group by winding a band-shaped positive electrode plate and a band-shaped negative electrode plate together with a separator disposed therebetween and accommodating the electrode group into a bottomed cylindrical metal battery case; (b) arranging a top insulator plate on the end surface of the electrode group, the top insulator plate being designed to be elastic and provided with a through hole at the center thereof; and (c) press-fitting the center core member into the through hole to fix the electrode group in the metal battery case.

The step (a) can be carried out according to the conventional well-known method. In the step (b), the top insulator plate is disposed over the accommodated electrode group. In this case, the top insulator plate, which is designed into a shape capable of exerting elasticity, can substantially contract to be smoothly inserted even when a pressure is applied from the inner wall of the battery case. The top insulator plate is preferably made of resin such as PP, PE, or POM.

In the step (c), the press-fitting of the center core member into the through hole of the top insulator plate can make the top insulator plate be propped and fixed between the inner wall of the battery case and the center core member, thereby preventing the electrode group from moving around inside the battery case. The presence of the slit in the through hole can secure the fixing of the top insulator plate because the slit is bent by the press-fitting of the center core member, thereby increasing the propping force. In addition, the tapered end of the center core member facilitates the insertion thereof into the through hole.

In the present invention, it is preferable that a plurality of protruding parts are formed on the outer peripheral edge of the top insulator plate and that the diameter of the virtual circle formed by connecting the tips of the protruding parts before the press-fitting of the center core member is 1 to 1.05 times the inner diameter of the metal battery case.

When the plural protruding parts are formed on the outer peripheral edge of the top insulator plate, it is preferable that the area of the tip of the protruding part in contact with the inner wall of the battery case or the size of the protruding part is made possibly smaller because such area or edge causes resistance at the time of the insertion. It is necessary to provide three protruding parts in the top insulator plate, and it is preferable to arrange four or more protruding parts in the top insulator plate in such a manner that these protruding parts are in contact with the inner wall of the battery case while virtually forming a regular polygon. When the number of the protruding parts is large, the processing cost increases and also the resistance at the time of the insertion increases. Therefore, four to eight protruding parts are especially preferable.

The tips of the protruding parts are preferably tapered because it can decrease the contact area with the inner wall of the battery case when the top insulator plate is being inserted, and increases the contact pressure by the propping force after the center core member is press-fitted.

The diameter of the virtual circle formed by connecting the tips of the protruding parts is made the same as the inner diameter of the battery case due to the propping force when the center core member is press-fitted. Before the press-fitting, on the other hand, too large a diameter of the top insulator plate would make the insertion thereof difficult and too small a diameter of the top insulator plate would make the propping force insufficient after the press-fitting. As a result, it is preferably 1 to 1.05 times the inner diameter of the metal battery case.

The present invention will be described in detail by using examples as follows, with reference to the drawings.

EXAMPLE 1

In the present example, a cylindrical lithium ion secondary battery with the structure shown in FIG. 1 was fabricated. An electrode group 1 was prepared by winding a positive electrode plate, a negative electrode plate, and a fine-porous polyethylene film separator (not illustrated) together spirally in such a manner that these electrode plates faced each other with the separator disposed therebetween. The electrode group 1 was accommodated in the battery case together with electrolyte.

The outer appearance of the battery was composed of a cylinder-shaped battery case 2 serving as a negative electrode terminal and a battery lid 3 serving as a positive electrode terminal. An insulating packing 4 was disposed between the inner regions of the top-end opening of the battery case 2 and the peripheral regions of the battery lid 3 so as to provide electrical isolation between them and to seal the battery.

Although it is not illustrated, another separator was disposed between the electrode group 1 and the inner surface of the battery case 2. The positive electrode plate was connected with the battery lid 3 via a positive electrode lead 5, and the negative plate was connected with the battery case 2 via a positive electrode current-collector plate 6. Then, a top insulator plate 7 was disposed and a hollow cylindrical center core member 8 with a slit was press-fitted.

The battery of the present example was 18 mm in diameter, 65 mm in height, and 1200 mAh in battery capacity. A steel can having a nickel-plated inside, a 0.2 mm-thick side surface, and a 0.5 mm-thick bottom surface was used for the battery case 2.

The positive electrode plate was prepared as follows. Electrolytic manganese dioxide (EMD:$MnO_2$) and lithium carbonate ($Li_2Co_3$) were mixed such that the amounts of Li and Mn satisfied Li/Mn=½. The obtained mixture was sintered for 20 hours at 800° C. in the atmosphere to obtain the positive electrode active material $LiMn_2O_4$. This positive electrode active material, acetylene black as a conductive agent, and polyvinylidene fluoride as a binder were mixed in a weight ratio of 92:3:5 so as to obtain a positive electrode material.

In order to knead the positive electrode material into a paste, the polyvinylidene fluoride as the binder was dispersed in N-methyl pyrrolidone, and the resultant dispersion was used. The above-mentioned mixture ratio was considered on the solid basis.

The positive electrode material paste was applied on both sides of the positive electrode current collector composed of a 15 μm-thick aluminum foil so as to form positive electrode material layers, thereby obtaining a positive electrode plate. The positive electrode material layers were the same in thickness and the sum of the thicknesses of the dried layers was 150 μm, and the positive electrode plate was 165 μm thick.

Then, the positive electrode plate was compression molded to have a thickness of 100 μm by using a press roll having a diameter of 300 mm. At this time, the positive electrode material had a density of 2.8 g/cm$^3$. One end of the positive electrode plate was scraped to form an unapplied part to which the positive electrode lead 5 was ultrasonically welded.

The negative electrode plate was prepared as follows. An artificial carbon black and styrene butadiene rubber (SBR) as a binder were mixed in a weight ratio of 97:3 to obtain a negative electrode material. In order to knead the negative electrode material into a paste, the styrene butadiene rubber as the binder was used as an aqueous dispersion. The above-mentioned weight ratio was considered on the solid basis.

The negative electrode material paste was applied on both sides of the negative electrode current collector made of a 14 μm-thick copper foil, while leaving a 4 mm-wide region at one end of the negative electrode current collector unapplied, so as to form negative electrode material layers, thereby obtaining a negative electrode plate.

Then, the negative electrode plate was compression-molded to have a thickness of 110 μm by using a press roll having a diameter of 300 mm. In this case, the negative electrode material had a density of 1.3 g/cm$^3$.

As the electrolyte, hexafluoro lithium phosphate (LiPF$_6$) as a solute at a concentration of 1 mon/dm$^3$ was dissolved in a mixture solvent containing ethylene carbonate (EC) and diethylene carbonate (DEC) in a volume ratio of 1:1.

The positive electrode plate and the negative electrode plate thus prepared were arranged to face each other with a separator disposed therebetween, and wound together spirally to form the electrode group 1 under the condition that the unapplied part of the negative electrode current collector was protruded. The protruding part was 2 mm in length.

The center material of the protruding part was bent to form a flat part. Then, the negative electrode current collector 6 was arranged to be pressed against the flat part so as to make them in tight contact with each other. And plural points on the surface of the negative electrode current collector 6 in the periphery thereof were irradiated with a laser beam in the radial direction from the center to the outer peripheral edge, thereby laser welding the current collector 6 and the flat part. This welding could be resistance welding.

Figure 4:
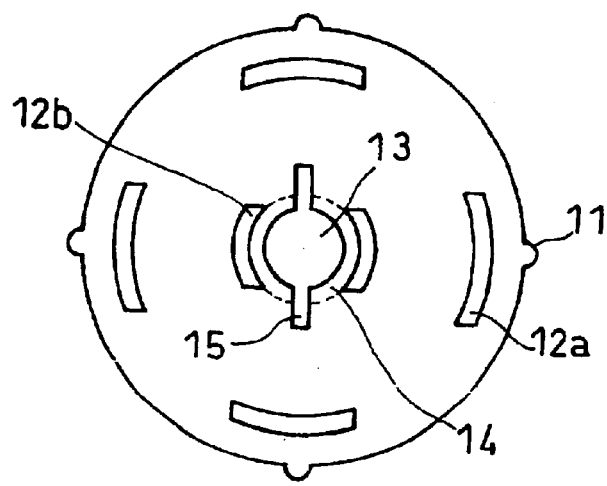
FIG. 4 is a top view of the top insulator plate of Example 1 in accordance with the present invention.

The electrode group 1 welded to the current collector 6 was accommodated in the battery case 2, and a welding rod was inserted into the center portion having a diameter of about 3.5 mm in the electrode group, thereby welding the negative electrode current collector 6 to the bottom of the battery case 2. Then, the positive electrode lead 5 was disposed on the electrode group 1 after being passed through the top insulator plate 7, which was 0.5 mm-thick and made of PP. FIG. 4 shows the top view of the top insulator plate 7.

As shown in FIG. 4, the top insulator plate 7 was in the form of a disk having a diameter of 17 mm, and was provided with four protruding parts 11 arranged in the form of a regular square. The protruding parts were semicircular shape and the tips thereof were made thinner. As a result, when the protruding parts 11 were pressed against the inner wall of the battery case 2, the contact pressure increased. The virtual circle formed by connecting the tips of the protruding parts 11 was 18.1 mm in diameter, and the inner diameter of the battery case 2 was 17.6 mm. As a result, the diameter of the virtual circle was about 1.03 times the inner diameter of the battery case 2.

Inside the protruding parts 11 of the top insulator plate were formed holes 12a in order to make the top insulator plate have a shaple capable of exerting elasticity. The holes 12a were able to be slits partially reaching the outer peripheral edge of the top insulator plate.

In addition, a through hole 13 having a diameter of 2.4 mm was formed in the center of the top insulator plate 7, and holes 12b, a protruding part 14, and a slit 15 were formed in the periphery of the through hole 13. The provision of the holes 12b and the slit 15 made the top insulator plate more elastic. The protruding part 14 had the effect of securing the holding of the center core member 8 when press-fitted.

The electrolyte was injected through these holes and slit. The positive electrode lead 5 was connected via the holes 12a. The insertion of the top insulator plate 7 into the battery case 2 was done smoothly because the tips of the protruding parts 11 were the only portions by which the top insulator plate 7 might be hooked during the insertion.

The hollow cylindrical center core member 8 having a slit of 2.5 mm in diameter was press-fitted into the through hole 13. The slit had the shape shown in FIG. 2. As a result, the top insulator plate 7 was propped and fixed between the inner wall of the battery case 2 and the center core member 8, which prevented the electrode group 1 from moving around inside the battery case 2.

Then, the battery case 2 was subjected to a process for making grooves to crimp the opening of the battery case 2. The positive electrode lead 5 was welded to the battery lid 3, and the above-mentioned electrolyte was poured. Finally, the battery lid 3 and the insulating packing 4 were crimped together to seal the battery.

EXAMPLE 2

Figure 5:
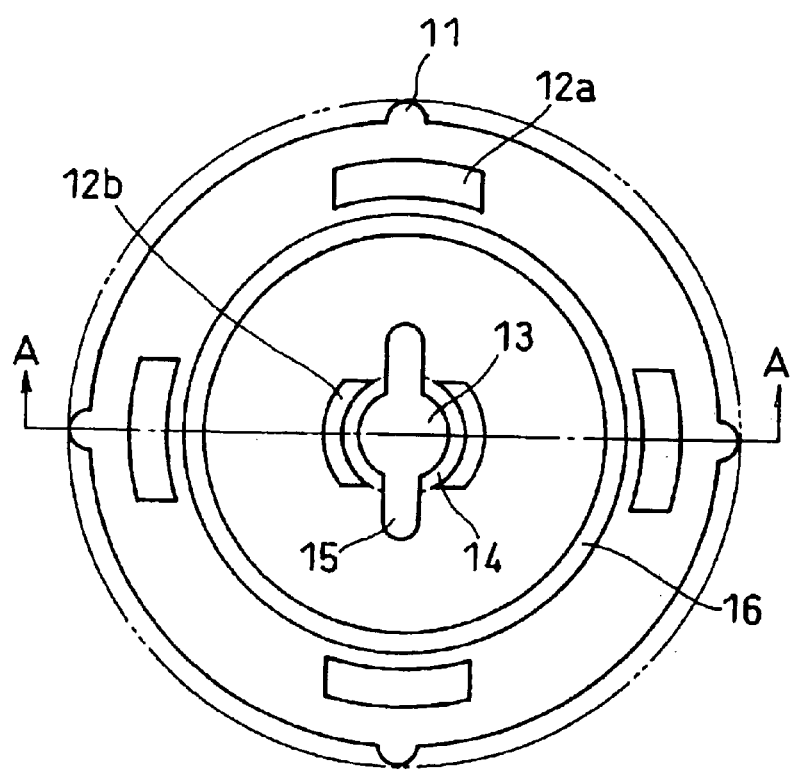
FIG. 5 is a top view of the top insulator plate of Example 2 in accordance with the present invention.
Figure 6:
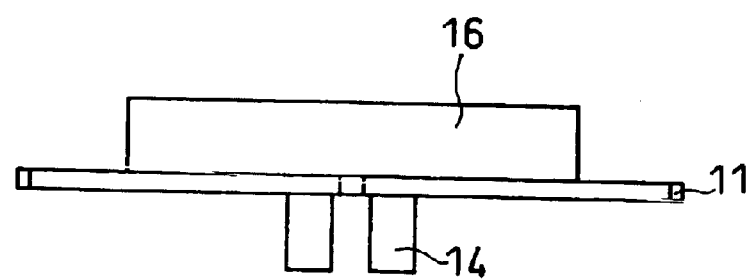
FIG. 6 is a side view of the top insulator plate of Example 2 in accordance with the present invention.
Figure 7:
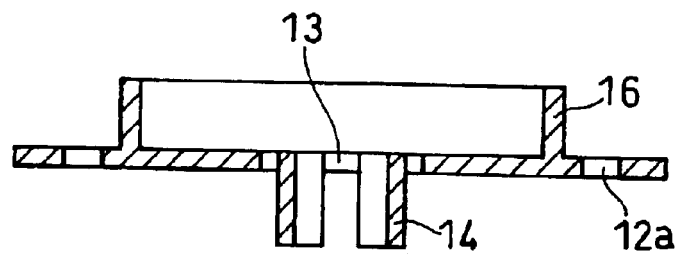
FIG. 7 is a sectional view taken along line A—A shown in FIG. 5.

In the present example, another cylindrical lithium ion secondary battery was fabricated in the same manner as in Example 1 except that the top insulator plate shown in FIGS. 5 through 7 was used.

FIG. 5 is the top view of the top insulator plate in accordance with the present example, and FIG. 6 is a side view of the same. FIG. 7 is a cross sectional view taken along the line A—A shown in FIG. 5.

Similar to the top insulator plate shown in FIG. 4, the top insulator plate shown in FIGS. 5 through 7 was provided with protruding parts 11, holes 12a, holes 12b, a through hole 13, a protruding part 14, and a slit 15. The top insulator plate was designed to have the same diameter and thickness as those of the top insulator plate of Example 1 and the protruding parts were designed to have the same shape and size as those of the protruding parts of Example 1.

In the present example, the top insulator plate was additionally provided with a ring 16. The ring 16 was in tight contact with the sealing plate, thereby increasing the effect of fixing the electrode group.

As described hereinbefore through the two examples, the electrode group can be fixed smoothly in the cylindrical lithium ion secondary battery in accordance with the present invention.

Thus, according to the cylindrical lithium ion secondary battery of the present invention and the fabrication method thereof, the insertion of the top insulator plate can be facilitated, thereby securing the fixation of the electrode group. As a result, it becomes possible to reduce the probability of the electrode group moving around in the battery to be damaged when the battery is dropped or shocked.

Furthermore, high safety standards can be maintained even when a high pressure is applied from outside the battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A cylindrical lithium ion secondary battery comprising:
   an electrode group comprising a band-shaped positive electrode plate and a band-shaped negative electrode plate which are wound together with a separator disposed therebetween; and
   a bottomed cylindrical metal battery case accommodating said electrode group together with a top insulator plate,
   said top insulator plate being designed to be elastic and provided in the center thereof with a through hole into which a center core member is press-fitted,
   wherein a plurality of protruding parts are provided on the outer peripheral surface of said top insulator plate, and the tips of said protruding parts are in tight contact with the inner wall of said battery case.

2. The cylindrical lithium ion secondary battery in accordance with claim 1, wherein said top insulator plate is made of resin.

3. The cylindrical lithium ion secondary battery in accordance with claim 1, wherein said center core member is made of metal.

4. The cylindrical lithium ion secondary battery in accordance with claim 1, wherein said center core member is in the form of a hollow cylinder with or without a slit, and at least one end of said center core member is a tapered or sharp end.

5. A cylindrical lithium ion secondary battery comprising:
   an electrode group comprising a band-shaped positive electrode plate and a band-shaped negative electrode plate which are wound together with a separator disposed therebetween; and
   a bottomed cylindrical metal battery case accommodating said electrode group together with a top insulator plate,
   said top insulator plate being designed to be elastic and provided in the center thereof with a through hole into which a center core member is press-fitted,
   wherein the diameter of a virtual circle formed by connecting tips of protruding parts, provided on the outer peripheral surface of said top insulator plate, before the press-fitting of said center core member is 1 to 1.05 times the inner diameter of said battery case.

6. The cylindrical lithium ion secondary battery in accordance with claim 5, wherein said top insulator plate is made of resin.

7. The cylindrical lithium ion secondary battery in accordance with claim 5, wherein said center core member is made of metal.

8. The cylindrical lithium ion secondary battery in accordance with claim 5, wherein said center core member is in the form of a hollow cylinder with or without a slit, and at least one end of said center core member is a tapered or sharp end.

9. A cylindrical lithium ion secondary battery comprising:
   an electrode group comprising a band-shaped positive electrode plate and a band-shaped negative electrode plate which are wound together with a separator disposed therebetween; and
   a bottomed cylindrical metal battery case accommodating said electrode group together with a top insulator plate,
   said top insulator plate being designed to be elastic and provided in the center thereof with a through hole into which a center core member is press-fitted,
   wherein said top insulator plate has a slit in the periphery of said through hole.

10. The cylindrical lithium ion secondary battery in accordance with claim 9, wherein said top insulator plate is made of resin.

11. The cylindrical lithium ion secondary battery in accordance with claim 9, wherein said center core member is made of metal.

12. The cylindrical lithium ion secondary battery in accordance with claim 9, wherein said center core member is in the form of a hollow cylinder with or without a slit, and at least one end of said center core member is a tapered or sharp end.

* * * * *